United States Patent [19]

Molnar et al.

[11] Patent Number: 5,713,025
[45] Date of Patent: Jan. 27, 1998

[54] ASYNCHRONOUS ARBITER USING MULTIPLE ARBITER ELEMENTS TO ENHANCE SPEED

[75] Inventors: Charles E. Molnar, Webster Groves, Mo.; Ian W. Jones, Palo Alto; Ivan E. Sutherland, Santa Monica, both of Calif.

[73] Assignee: Sun Microsystems, Inc., Mountain View, Calif.

[21] Appl. No.: 303,247

[22] Filed: Sep. 8, 1994

Related U.S. Application Data

[63] Continuation-in-part of Ser. No. 140,654, Oct. 21, 1993, abandoned, and Ser. No. 140,655, Oct. 21, 1993, abandoned.

[51] Int. Cl.$^6$ .................. G06F 13/364; G06F 13/14
[52] U.S. Cl. .................. 395/729; 395/293; 370/85.2; 370/85.6; 340/825.51
[58] Field of Search .................. 395/729, 732, 395/293, 303, 291, 299, 730; 327/19; 340/825.51; 370/85.2, 85.6

[56] References Cited

U.S. PATENT DOCUMENTS

| | | | |
|---|---|---|---|
| 4,376,975 | 3/1983 | Comfort et al. | 385/731 |
| 4,423,384 | 12/1983 | DeBock | 327/19 |
| 4,604,694 | 8/1986 | Hough | 395/650 |
| 4,698,753 | 10/1987 | Hubbins et al. | 395/200.05 |
| 4,774,660 | 9/1988 | Conforti | 395/729 |
| 4,835,672 | 5/1989 | Zenk et al. | 395/478 |
| 4,872,004 | 10/1989 | Bahnick et al. | 340/825.5 |
| 4,894,565 | 1/1990 | Marquardt | 327/19 |
| 4,924,380 | 5/1990 | McKinney et al. | 395/291 |
| 4,962,379 | 10/1990 | Yasuda et al. | 340/825.51 |
| 4,969,120 | 11/1990 | Azevedo et al. | 395/297 |
| 5,038,276 | 8/1991 | Bozzetti et al. | 395/550 |
| 5,167,022 | 11/1992 | Bahr et al. | 395/288 |
| 5,193,197 | 3/1993 | Thacker | 395/303 |
| 5,214,775 | 5/1993 | Yabushita et al. | 395/444 |
| 5,265,212 | 11/1993 | Bance, II | 395/293 |
| 5,313,641 | 5/1994 | Simcoe et al. | 395/730 |
| 5,341,052 | 8/1994 | Dike et al. | 327/19 |
| 5,404,540 | 4/1995 | Dike | 395/732 |
| 5,408,629 | 4/1995 | Tsuchiya et al. | 395/478 |
| 5,442,758 | 8/1995 | Slingwine et al. | 395/375 |

OTHER PUBLICATIONS

Slides presented at the Proceedings of the "VII Banff Workshop:Asynchronous Hardware Design", Aug. 28–Sep. 23, 1993, 3 Pages, by Al Davis, Hewlett Packard, Palo Alto, California.

Article entitled "Synthesizing Asynchronous Circuits:Practice & Experience", (from the book from the VII Banff Workshop: Asynchronous Hardware Design held in 1993), by Al Davis, Department of Computer Science, University of Utah, 3 Pages, 1995.

Engineering notebook pages, dated Oct. 11 & 12, 1988, prepared by Mr. Ken Stevens while employed by H–P, in Palo Alto, CA. (Note, no citation is provided because to Applicants' knowledge, these pages were never published.).

(List continued on next page.)

*Primary Examiner*—Gopal C. Ray
*Attorney, Agent, or Firm*—James W. Rose

[57] ABSTRACT

An arbiter circuit is described that is capable of granting a first user access to a shared resource while concurrently arbitrating subsequent requests from the first user to other users seeking access to the shared resource. The arbiter of the present invention includes a first arbiter element and a second arbiter element. The first arbiter element is initially used to arbitrate and issue a grant signal in response to one or more request signals from two or more users. The second arbiter element arbitrates and issues the next grant signal in response to subsequent request signal or signals from the one or other users. In one embodiment of the invention, the first and second arbiter elements are used alternately. In other embodiments, third and fourth arbiter elements are used to arbitrate in response to subsequent requests. The arbiter circuits of the present invention all reduce the delays in the access of users to the shared resource.

25 Claims, 4 Drawing Sheets

OTHER PUBLICATIONS

"SBC: A Multiport Memory Building Block for Asynchronous Systems", by A.L. Davis & Ken Stevens, Schlumberger P.A. Research Center, Palo Alto, CA, Nov. 12, 1987. (Note, no citation is provided because to Applicants' knowledge, this paper was never published.).

"2 Input Sequence Example", by Alex Yakovlev, Apr. 30, 1994. This reference was obtained from an asynchronous systems interest group email circulation. It is believed that addtional copies may be obtained by contacting Mr. Yakovlev at email ID alex.yakovlev@newcastle.ac.uk.

"Introduction to VLSI Systems", Carver Mead and Lynn Conway, Addison–Wesley, 1980, pp. 260–261.

ASYNCHRONOUS ARBITER USING MULTIPLE ARBITER ELEMENTS TO ENHANCE SPEED

CROSS-REFERENCE TO RELATED APPLICATIONS

This is a continuation in part of U.S. patent application Ser. No. 08/140,654, entitled "Counterflow Pipeline" and Ser. No. 08/140,655 entitled "Counterflow Pipeline Processor", both filed Oct. 21, 1993, now abandoned and incorporated by reference herein.

BACKGROUND OF THE INVENTION

1. Field of the Invention

The present invention relates to asynchronous arbiter circuits, and more particularly, to an arbiter circuit having a first-invoked arbiter element for granting access to a shared resource to a first user and a second-invoked arbiter element capable of concurrently processing the next request or requests for access to the shared resource among the first and/or other users so that them is minimal delay between successive grants.

2. Description of the Related Art

Arbiters are devices that allocate access to a shared resource among two or more users, where the resource can service only one user at a time. For example, access must be arbitrated between two users that wish to write to the same memory location to avoid having an improper value being stored in the memory location. An arbiter is therefore needed to govern access to the memory location among the two users.

For proper operation, an arbiter system must follow a basic set of rules: (1) the arbiter is permitted to issue a grant signal to a user only after receiving a request signal from that user; (2) after issuing a grant to a user, the arbiter must not issue a second grant signal to any user until a done signal is received from the shared resource; (3) if a user makes a first request, that user is not permitted to make a second request until a grant for the first request is received; and (4) the arbiter must receive a done signal following each grant signal.

Referring to FIG. 1, a block diagram of an arbiter system is shown. The arbiter system 10 includes an arbiter block 12, a first user 14, a second user 16, and a shared resource 18. (The terms "first user" and "second user" are terms of distinction, and are not intended to define which user has first access to the shared resource 18.) During operation, the first user 14 and the second user 16 may request access to the shared resource 18. When the first user 14 requests access, it generates request signal R1, and the arbiter block 12 generates a grant signal G1 in response thereto, providing the first user exclusive use of the shared resource 18. The shared resource 18 generates a done signal D when the first user 14 is finished using the shared resource 18. Upon receipt of done signal D, the arbiter block 12 is free to issue another grant signal. The second user 16 likewise generates request signal R2, the arbiter block 12 generates grant signal G2, and the shared resource 18 generates done signal D when the second user 16 requests, is granted, and receives use of the shared resource 18.

On occasion, the first user 14 and the second user 16 generate request signals R1 and R2 at approximately the same time. In response thereto, the arbiter block 12 selects and generates one grant signal, either G1 or G2, but not both. The request for the non-selected user remains ungranted. When the done signal D is received for the issued grant, the process for additional request via R1 and signal R2 is repeated. It should be noted that even when the arbiter block 12 obeys the arbitration rules, the arbitration is not necessarily "fair". The previously non-selected requester could be preempted repeatedly in favor of the previously selected requester in the next arbitration decision.

Referring to FIG. 2, a circuit diagram of the arbiter block 12 according to the prior art is shown. The arbiter circuit 80 includes a mutual exclusion element (MUTEX) 30, first C element 32, a second C element 34, first XOR gate 36, a second XOR gate 38, a first toggle element 40, a second toggle element 42, a decision wait circuit 44, a first inverter 46, a second inverter 48 and a third inverter 49.

The arbiter circuit 80, according to one technique known in the prior art, relies on transition signaling. With transition signaling, each transition on the electrical connection carrying request signal, either R1 or R2, represents a new request from the first user 14 or the second user 16 respectively. Similarly, each transition on the electrical connection carrying a grant signal, either G1 or G2, represents a new grant of access to the shared resource 18 for the first user 14 or the second user 16 respectively. In contrast, with level signaling, often referred to as four-phase or return-to-zero signaling, requests and grants are signaled only by transitions from low to high, and consecutive signals require an intervening high to low transition. Systems using transition signaling may be faster than systems using level signaling because time and resources are not wasted in the resetting of signals.

The first C element 32 receives request signal R1 from the first user 14 and signal 52 from inverter 46 which inverts the even output 50 of the first toggle element 40. If both input signals to the first C element 32 are high, then the output 54 of the first C element transitions high. Alternatively, if both input signals are low, then the output 54 of the first C element 32 transitions low. If one input is high and the other input is low, the output 54 of the first C element 32 maintains its present state. The second C element 34 generates an output signal 58 in response to request signal R2 and signal 56 from inverter 48 which inverts the even output 51 from the second toggle element 42 in a similar manner.

The MUTEX 30 is responsible for receiving requests from the first user 14 and the second user 16 and selecting either the first user 14 or the second user 16 to receive a grant. If the output 60 from the first XOR gate 36 transitions high, indicating a request from the first user 14, then the output 64 of the MUTEX 30 transitions high. Alternatively, if the output 62 from the second XOR gate 38 transitions high, indicating a request from the second user 16, then the output 66 of the MUTEX 30 transitions high. If both signal 60 and 62 transition high at approximately the same time, indicating competing requests from the first user 14 and the second user 16, then the MUTEX 30 selects one of the two input signals, but not both. The output signal, either 64 or 66, transitions high in response to the selected input signal 60 or 62 respectively. The non-selected request remains ungranted. When the shared resource 18 is done serving the selected user, the arbitration process is repeated.

The first toggle element 40 is coupled to receive signal 64 from the MUTEX 30. The first toggle element 40 has an odd output 68 coupled to a first input of decision wait circuit 44 and an even output 50 coupled to the first C element 32 through inverter 46. The odd output 68 and the even output 50 of the first toggle element 40 are initially low. The first transition of the signal 64 from the MUTEX 30 causes a high transition on the odd output 68 of the first toggle element 40. A subsequent low transition of the signal 64 causes the even output 50 of the first toggle element 40 to transition high. The next high transition of the signal 64 causes the odd output 68 to transition low and the next low transition of signal 64 causes the even output 50 to transition low. This pattern is repeated for each subsequent high and low transition of the signal 64 from the MUTEX 30. The second toggle element 42 is coupled to receive signal 66 from the MUTEX 30. The second toggle element 42 has an odd output 70 coupled to a second input of decision wait circuit 44 and an even output 51 coupled to the second C element 34 through inverter 48. The high and low transitions of the second output 66 of the MUTEX 30 causes similar transitions to occur on the odd output 70 and the even output 51 of the second toggle element 42 as described with respect to the first toggle element 40.

The decision wait circuit 44 generates grant signal G1 or grant signal G2 in response to signal 68 from the first toggle element 40 or signal 70 from the second toggle element 42 respectively. Operation of the decision wait circuit 44 is best described using several examples. If signal 68 transitions, the decision wait circuit 44 causes grant signal G1 to transition upon receipt of the done signal D for the previous grant, and the first user 14 gains exclusive access to the shared resource 18. On the other hand, if the done signal D for the previous grant was received prior to the transition of signal 68, the decision wait circuit 44 transitions grant signal G1 immediately following the transition of signal 68. Alternatively, if input signal 70 transitions, the decision wait circuit 44 causes grant signal G2 to transition upon receipt of the done signal D for the previous grant, and the second user 16 gains exclusive access to the shared resource. Alternatively, if the done signal D for the previous grant was received prior to the transition of signal 70, the decision wait circuit 44 transitions grant signal G2 immediately following the transition of signal 70. It is useful to note that the arbitration process performed by the MUTEX 30 prevents signal 68 and signal 70 from both transitioning.

The arbiter circuit 80 has two states of operation for each request signal; the ready state and the recovering state. The two states of operation of the arbiter circuit 80 are described in more detail below. When the arbiter circuit 80 is initialized, it is in the ready state, as if the done signal D has already been received following a previous grant. The first user 14 and/or the second user 16 may request access to the shared resource 18. For example, if the first user 14 requests access to the shared resource 18, request signal R1 transitions high. As a result, the output 54 of the first C element 32, the output 60 of the first XOR gate 36, the output 64 of the MUTEX 30, the odd output 68 of the first toggle element 40, and the grant signal G1 all successively transition high, thereby providing the first user 14 exclusive access to the shared resource 18.

Once the arbiter circuit 80 grants access of the shared resource 18 to the first user 14, the arbiter circuit 80 enters the recovery state. The arbiter circuit 80 cannot issue a new grant to the first user until the recovery process is completed. During the recovery period, the output 54 of the first C element remains high because its input signal 52 remains high, regardless of whether the request signal R1 remains high or transitions low, indicating a new request from the first user. After the grant signal G1 is generated, the output 60 of the first XOR gate 36 transitions low because its two inputs (G1 and signal 54) are high, causing the output 64 of the MUTEX 30 to transition low, the even output 50 of the first toggle element 40 to transition high, and the output 52 of inverter 46 to transition low, completing the recovery process.

If the request signal R1 transitions low, either during or after recovery, it signifies a new request from the first user 14. The output of the first C element 32 transitions low only when its two inputs (R1 and signal 52) are both low. This causes the output 60 of XOR gate 36, and output 64 of MUTEX 30 to successively transition high. As a result, the odd output 68 of first toggle element 40 transitions low and the decision wait circuit 44 transitions the grant signal G1 low when the done signal D is received at the decision wait circuit 44, after being inverted by inverter 49. If the done signal D was previously received, then grant signal G1 transitions immediately after transition of signal 68.

The elements of the arbiter circuit 80 used for processing request signal R2 from the second user 16 are similar to those described above and operate concurrently with the elements used to process request signal R1. As previously described, the MUTEX 30 arbitrates between requests from the first user 14 and the second user 16 that occur at approximately the same time.

A problem with the arbiter circuit 80 is that its decision process may be linear, that is sequential. The arbiter circuit 80 includes a single MUTEX 30 to process the request signals generated by the first user 14 and the second user 16. If the arbiter circuit 80 generates a grant signal G1 in response to a request signal R1, the arbiter circuit 80 first needs to complete the recovery process described above before processing a next request R1 from the fast user 14. Under these circumstances, the recovery process incurs a delay before the next grant can be issued. With successive rapid requests from the same user, a significant portion of the total time of the arbitration process is dedicated to the recovery function, and a smaller percentage of the overall arbiter work product is dedicated to performing useful work, i.e., granting a user access to the shared resource.

Another problem with the arbiter circuit 80 is exemplified with alternating requests between the first user 14 and the second user 16. Consider a situation where the second user 16 generates a request R2 after a request has been granted to the first user 14. The arbiter circuit 80 can generate grant signal G2 only after the grant signal G1 is fed back to the XOR gate 36 and the output 60 of the gate transitions low, thus permitting the second output 66 of the MUTEX 30 to switch high. If the done signal D occurs before the subsequent request R2 from the second user 16, then the time needed for XOR gate 36 to respond to the grant signal G1, together with time for the MUTEX 30 to respond to the low transition of output 60 of XOR gate 36, introduces a delay before the second user 16 can access the shared resource 18. This results in an "unfair" allocation of access to the shared resource to the first user.

SUMMARY OF THE INVENTION

The present invention encompasses arbiter circuits that include two or more arbiter elements. The first arbiter element invoked arbitrates requests from one or more users and issues a first grant signal to one of the requesting users. A second-invoked arbiter element is then used to issue a second grant signal in response to any ungranted requests from any user. The second-invoked arbiter element is capable of starting its arbitration process immediately following the generation of the first grant signal from the first arbiter element. Under these circumstances, the second grant signal is issued when the done signal associated with the first grant is received from the shared resource and the second arbitration process is completed. Receipt of the first done signal from the shared resource disconnects the first-invoked arbiter element and enables the output from the second-invoked arbiter element to produce the second grant signal. The first-invoked arbiter element starts its recovery process when its request is granted, and the recovery is completed concurrently with the next grant signal issued by the second-invoked arbiter element. According to various embodiments of the invention, the first arbiter element or a third arbiter element may be invoked to arbitrate, and then issue the third grant signal.

The use of more than one arbiter element in an arbiter offers significant advantages over the prior art. The arbiter element that generated the previous grant signal may be recovering while another arbiter element concurrently arbitrates and issues the next grant signal. As a result, the next grant signal can be generated almost immediately after the done signal associated with the previous grant has been received, provided the current arbitration process has already completed. By using multiple arbiter elements, successive requests, even from a single user, will be arbitrated by different arbiter elements. Thus the delay between successive grant signals is substantially reduced. Accordingly, the performance of the arbiter system is improved because the percentage of time the shared resource is accessed is increased.

DESCRIPTION OF THE DRAWINGS

The objects, features and advantages of the system of the present invention will be apparent from the following description in which.

DESCRIPTION OF THE PREFERRED EMBODIMENT

Figure 1:
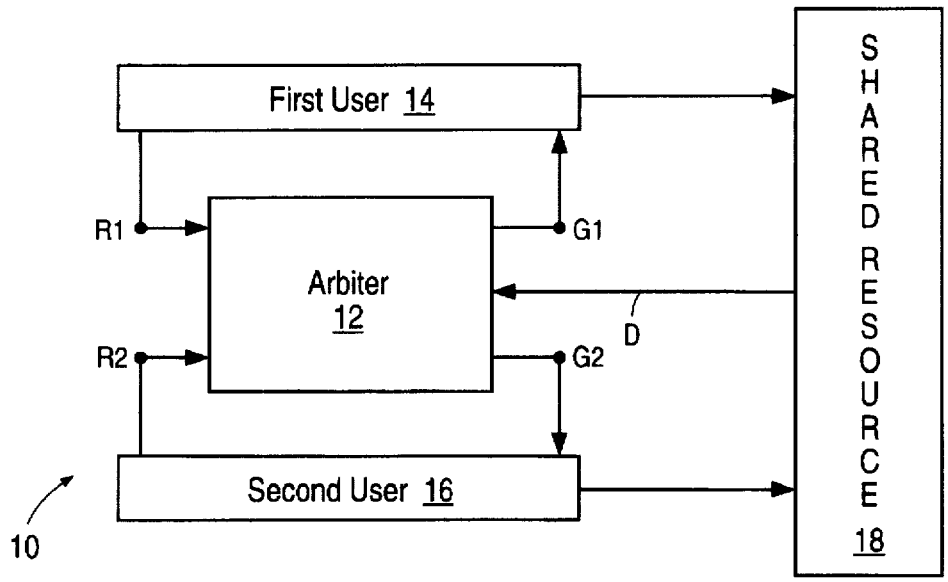
FIG. 1 illustrates a block diagram of an arbiter system according to the prior art.
Figure 2:
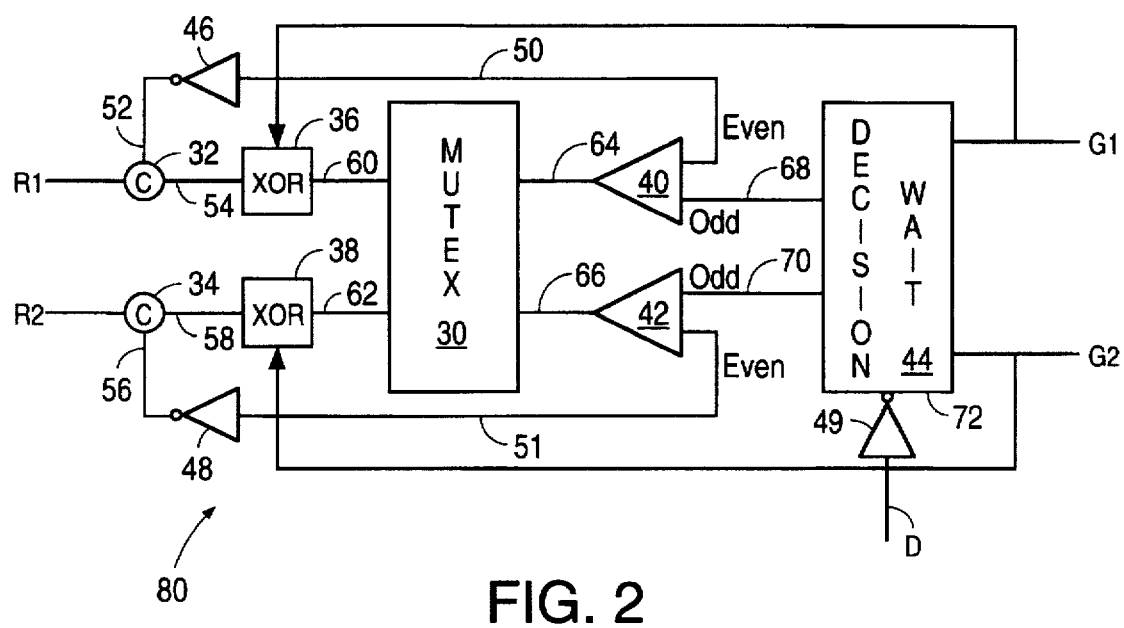
FIG. 2 illustrates an arbiter circuit according to the prior art.
Figure 3:
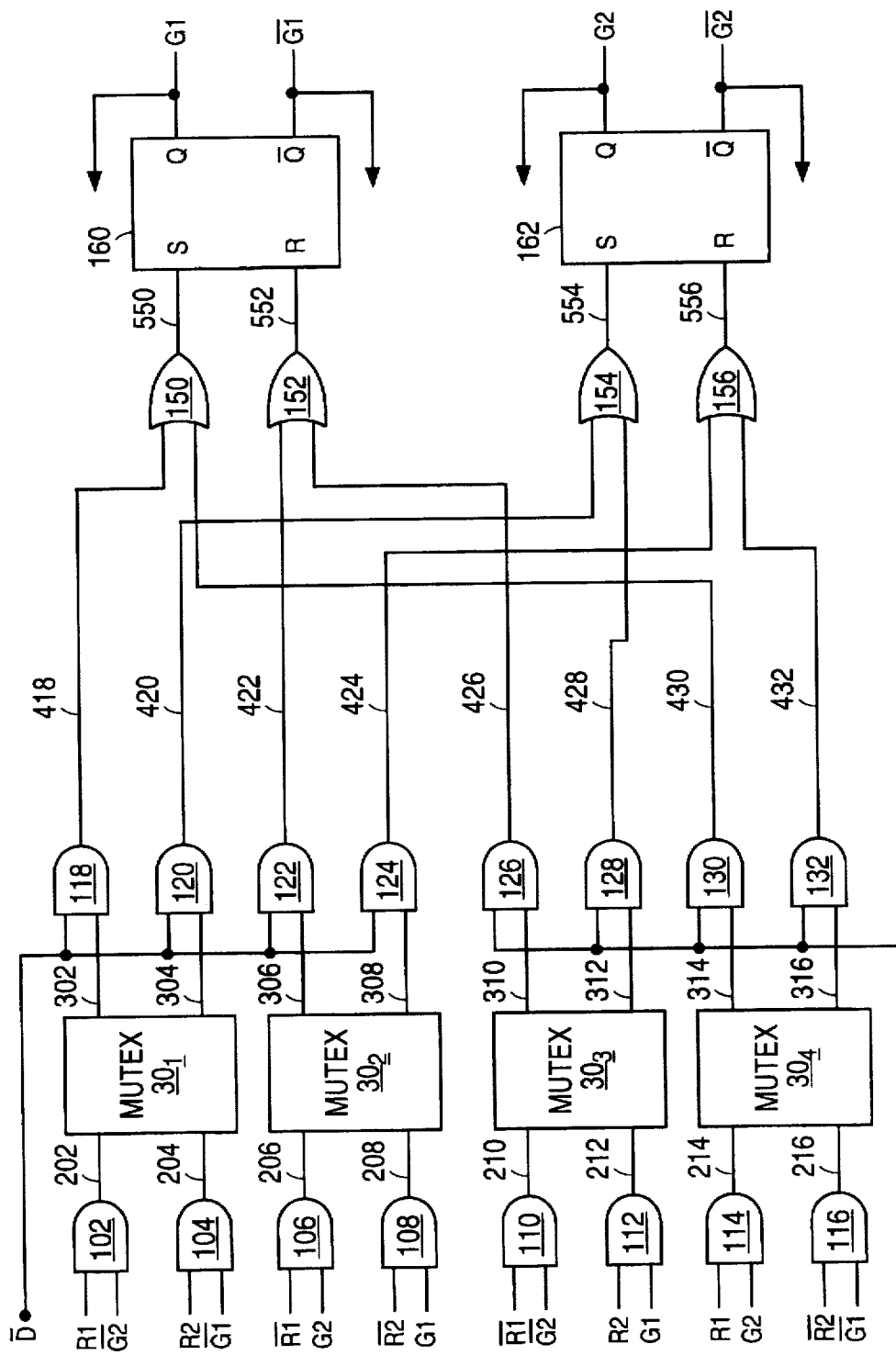
FIG. 3 illustrates a first arbiter circuit according to one embodiment of the present invention.

Referring to FIG. 3, a logic diagram of an arbiter circuit of the present invention is shown. The arbiter circuit 100 includes AND gates 102 through 132, a plurality of MUTEX elements $30_1$ through $30_4$, OR gates 150 through 156, and SR flip flops 160 and 162. The arbiter circuit 100 is intended to be used in the arbiter block 12 of arbiter system 10 illustrated in FIG. 1. As such, reference is made to the first user 14, the second user 16, the shared resource 18, request signals R1 and R2, grant signals G1 and G2, and done signal D in the following discussion.

The AND gates 102 through 116 are each coupled to receive a unique combination of two input signals selected from the group of request signal R1, request signal R2, grant signal G1, grant signal G2, and their complements $\overline{R1}$, $\overline{R2}$, $\overline{G1}$ and $\overline{G2}$ respectively. The specific two input signals, along with the reference number designating the output signal for the AND gates 102 through 116 are respectively set forth in Table I below.

TABLE I

| GATE | Inputs | Output |
|------|--------|--------|
| 102 | R1, $\overline{G2}$ | 202 |
| 104 | R2, $\overline{G1}$ | 204 |
| 106 | $\overline{R1}$, G2 | 206 |
| 108 | $\overline{R2}$, G1 | 208 |
| 110 | $\overline{R1}$, $\overline{G2}$ | 210 |
| 112 | R2, G1 | 212 |
| 114 | R1, G2 | 214 |
| 116 | $\overline{R2}$, $\overline{G1}$ | 216 |

The MUTEX elements $30_1$ through $30_4$, each receive two of the signals 202 through 216 from AND gates 102 through 116 and generates two output signals 302 through 316 respectively. Table II below specifies the two input signals received and the two output signals generated by each MUTEX element $30_1$ through $30_4$ respectively.

TABLE II

| MUTEX Element | Inputs | Outputs |
|---------------|--------|---------|
| $30_1$ | 202, 204 | 302, 304 |
| $30_2$ | 206, 208 | 306, 308 |
| $30_3$ | 210, 212 | 310, 312 |
| $30_4$ | 214, 216 | 314, 316 |

The AND gates 118 through 132 are each coupled to receive one of the output signals 302 through 316 from the MUTEX elements $30_1$ through $30_4$ and either a done signal D or the complement of the done signal $\overline{D}$. Table III below lists the specific input signals provided to AND gates 118 through 132 and the output signal generated by AND gates 118 through 132 respectively.

TABLE III

| GATE | Input Signals | Output Signals |
|------|---------------|----------------|
| 118 | 302, $\overline{D}$ | 418 |
| 120 | 304, $\overline{D}$ | 420 |
| 122 | 306, $\overline{D}$ | 422 |
| 124 | 308, $\overline{D}$ | 424 |
| 126 | 310, D | 426 |
| 128 | 312, D | 428 |
| 130 | 314, D | 430 |
| 132 | 316, D | 432 |

The OR gates 150 through 156 are coupled to each receive two of the output signals 418 through 432 respectively. Table IV below lists the specific input signals to OR gates 150 through 156 and the output signals 550 through 556 generated by OR gates 150 through 156 respectively.

TABLE IV

| GATE | Input Signals | Output Signal |
|------|---------------|---------------|
| 150 | 418, 430 | 550 |
| 152 | 422, 426 | 552 |
| 154 | 420, 428 | 554 |
| 156 | 424, 432 | 556 |

The first flip flop 160 is coupled to receive signal 550 at its set (S) input and signal 552 at its reset (R) input and to issue grant signal G1 and complementary signal $\overline{G1}$ in response thereto. The second flip flop 162 is coupled to receive signal 554 at its set (S) input and signal 556 at its (R)

input and to issue grant signal G2 and complementary signal $\overline{G2}$ in response thereto. As previously noted, grant signals G1 and G2 and complementary signals $\overline{G1}$ and $\overline{G2}$ are fed back to the inputs of AND gates 102 through 116, as noted in Table I above.

OPERATION

A. Initial State

Operation of the arbiter circuit 100 is best described starting from the initial state. Request signal R1 from the first user and request signal R2 from the second user are both at logic low levels (i.e., R1=0 and R2=0) in the initial state. Similarly, grant signal G1, grant signal G2 and done signal D are all at logic low levels (i.e., G1=0, G2=0 and D=0). Under these conditions, the output signals 550 through 556 of OR gates 150 through 156 are all low. As a result G1 and G2 remain low and $\overline{G1}$ and $\overline{G2}$ are high. The logic levels at the inputs and outputs of AND gates 102 through 116, MUTEX elements $30_1$, through $30_4$, and AND gates 118 through 132 are provided in Table V below.

TABLE V

| Input Signals | AND Gate | Signal | MUTEX | Signal | Done Signal | AND Gate | Signal |
|---|---|---|---|---|---|---|---|
| R1 = 0, $\overline{G2}$ = 1 | 102 | 202 = 0 | $30_1$ | 302 = 0 | $\overline{D}$ = 1 | 118 | 418 = 0 |
| R2 = 0, $\overline{G1}$ = 1 | 104 | 204 = 0 | $30_1$ | 304 = 0 | $\overline{D}$ = 1 | 120 | 420 = 0 |
| $\overline{R1}$ = 1, G2 = 0 | 106 | 206 = 0 | $30_2$ | 306 = 0 | $\overline{D}$ = 1 | 122 | 422 = 0 |
| $\overline{R2}$ = 1, G1 = 0 | 108 | 208 = 0 | $30_2$ | 308 = 0 | $\overline{D}$ = 1 | 124 | 424 = 0 |
| $\overline{R1}$ = 1, $\overline{G2}$ = 1 | 110 | 210 = 1 | $30_3$ | 310 = 1 | D = 0 | 126 | 426 = 0 |
| R2 = 0, G1 = 0 | 112 | 212 = 0 | $30_3$ | 312 = 0 | D = 0 | 128 | 428 = 0 |
| R1 = 0, G2 = 0 | 114 | 214 = 0 | $30_4$ | 314 = 0 | D = 0 | 130 | 430 = 0 |
| $\overline{R2}$ = 1, $\overline{G1}$ = 1 | 116 | 216 = 1 | $30_4$ | 316 = 1 | D = 0 | 132 | 432 = 0 |

It is useful to note that in the initial state, the two inputs into AND gate 110 are both high ($\overline{R1}$=1, $\overline{G2}$=1). Consequently, the output 210 of AND gate 110 and the output 310 of MUTEX $30_3$ are also both high. Since the done signal D is initially low, the output of AND gate 126 is low. Consequently, the output 552 of OR gate 152 is low because both of its inputs 422 and 426 are low. This same condition is present for AND gate 116, MUTEX $30_4$, AND gate 132 and OR gate 156.

B. Arbitration State

Three examples below have been selected to illustrate the operation of the arbiter circuit 100. In the examples, the first user 14 makes a first request followed by a subsequent request from (a) the first user 14; (b) the second user 16; (c) both the first user 14 and the second user 16.

When the first user 14 requests access to the shared resource 18, the request signal R1 transitions high. As a result, the output 202 of AND gate 102, the output 302 of MUTEX element $30_1$, the output 418 of AND gate 118, the output 550 of OR gate 150, and grant signal G1 of the first flip flop 160 all successively transition high, granting the first user 14 exclusive use of the shared resource 18.

It is useful to note that during any grant period, the signals G1, $\overline{G1}$, G2 and $\overline{G2}$ are fed back to the various inputs of AND gates 102 through 116. The current state of signals G1, $\overline{G1}$, G2 and $\overline{G2}$ are used to select, that is invoke, one of the four MUTEX element $30_1$ through $30_4$. The invoked MUTEX is then designated to arbitrate the next request signal or signals. With G1=1 and G2=0, MUTEX element $30_3$ arbitrates the next request, regardless of whether the first user 14, the second user 16, or both, generates the next request or requests. Each of these possibilities is discussed below.

a. If the first user 14 generates the next request, the request signal R1 transitions from high to low. The inputs (i.e., $\overline{R1}$ and $\overline{G2}$) of AND gate 110 are consequently both high, causing the output signal 210 of AND gate 110, and the output 310 of the MUTEX element $30_3$ to transition high. When the done signal D transitions high, indicating the availability of the shared resource 18, both inputs to AND gate 126 are high. As a result, the output 426 of AND gate 126, the output 552 of OR gate 152, and grant signal $\overline{G1}$ of flip flop 160 all successively transition high, and G1 transitions low, again providing the first user 14 exclusive access to the shared resource. It is useful to note that the new state of grant signals (G1=0, $\overline{G1}$=1, G2=0, $\overline{G2}$=1) designates the fast MUTEX element $30_1$ to handle the next request from the first user 14, the second user 16, or both.

b. If the second user 16 generates the next request, the request signal R2 transitions from low to high. The inputs (i.e., R2 and G1) of AND gate 112 are therefore both high, causing the output 212 of AND gate 112 and output 312 of MUTEX element $30_3$ to transition high. As a result, when the done signal D transitions high, indicating the availability of the shared resource 18, the output 428 of AND gate 128, the output 554 of OR gate 154 and grant signal G2 of flip flop 162 all successively transition high, providing the second user 16 exclusive access to the shared resource 18. It is useful to again note that with the new state of grant signals (G1=1, $\overline{G1}$=0, G2=1, $\overline{G2}$=0), the second MUTEX $30_2$ is designated to handle the next request from the first user 14, the second user 16, or both.

c. If the first user 14 and the second user 16 generate a transition on request signal R1 and a transition on request signal R2 at approximately the same time, then both output signals 210 and 212 of AND gates 110 and 112 transition high, possibly causing the MUTEX element $30_3$ to enter a metastable state. Eventually, one of the MUTEX outputs 310 or 312 is selected and transitions high, causing either G1 or G2 to transition as described in the two examples above. The non-selected request remains ungranted until selected in a subsequent arbitration process.

The done signal D and $\overline{D}$ as applied to the inputs of AND gates 118 through 132 guarantees that flip flops 160 and 162 do not transition during the time the shared resource 18 is being accessed by the current user. If the done signal D has already occurred prior to the next request signal or signals, then the arbiter circuit 100 issues a grant signal immediately after the designated MUTEX has selected the next user.

The arbiter 100 provides a number of unique features not found in the prior art. Each one of the four MUTEX elements $30_1$ through $30_4$ defines an "arbiter element". At any point in time, only one of the four arbiter elements is used to arbitrate and issue a grant signal for the then current request or request signals received by the arbiter 100. The output state of the arbiter 100, after issuing the previous grant, is used to designate the current arbiter element. Similarly, the output state of the arbiter 100, after arbitrating the current request signal or signals, is used to designate the next arbiter element.

The arbitration process for the current request signal or signals starts as soon as the grant signal from the previous arbitration is issued. When the current request signal or signals is received at the arbiter 100, the current MUTEX processes and arbitrates the signals immediately. As a result, there is only a minor delay of a few logic gates between the current request signal and grant signal after the done signal is received, unless nearly simultaneous requests cause the current MUTEX to respond with a delay prolonged by metastability.

Figure 4:
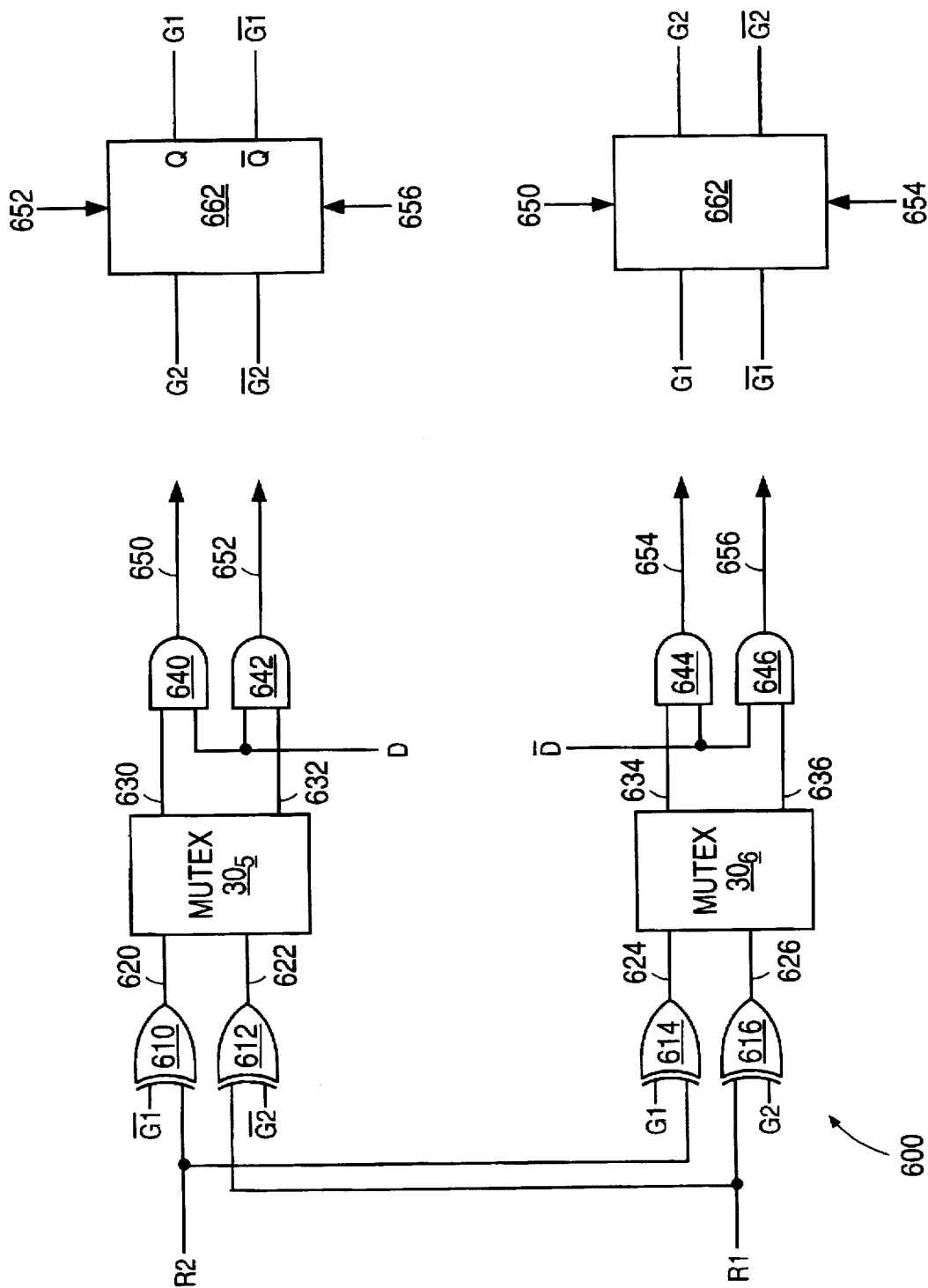
FIG. 4 illustrates a second arbiter circuit according to a second embodiment of the present invention.

Referring to FIG. 4, an arbiter circuit according to a second embodiment of the present invention is shown. The arbiter circuit 600 includes XOR gates 610 through 616, MUTEX elements $30_5$ and $30_6$, AND gates 640 through 646, and latches 660 and 662.

The specific input signals and output signals for the XOR gates 610 through 616 are provided in TABLE VI below.

TABLE VI

| GATE | Inputs | Output |
|---|---|---|
| 610 | R2, $\overline{G1}$ | 620 |
| 612 | R1, $\overline{G2}$ | 622 |
| 614 | R2, G1 | 624 |
| 616 | R1, G2 | 626 |

The specific input signals and output signals for the MUTEX elements $30_5$ and $30_6$ are provided in the TABLE VII below.

TABLE VII

| MUTEX Element | Inputs | Outputs |
|---|---|---|
| $30_5$ | 620, 622 | 630, 632 |
| $30_6$ | 624, 626 | 634, 636 |

The specific input signals and specific output signals for the AND gates 640 through 646 are provided in TABLE VIII below.

TABLE VIII

| GATE | Inputs | Output |
|---|---|---|
| 640 | 630, D | 650 |
| 642 | 632, D | 652 |
| 644 | 634, $\bar{D}$ | 654 |
| 646 | 636, $\bar{D}$ | 656 |

The two data input signals, two control input signals, and two data output signals for the two-input latches 660 and 662 are provided in TABLE IX below.

TABLE IX

| Data Input | Control Input | Data Output |
|---|---|---|
| Latch 660 | | |
| G2 | 652 | G1,$\overline{G1}$ |
| $\overline{G2}$ | 656 | |
| Latch 662 | | |
| G1 | 650 | G2,$\overline{G2}$ |
| $\overline{G1}$ | 654 | |

It should be noted that with the first latch 660, the data input G2 determines the data outputs G1 and $\overline{G1}$ when the control input signal 652 is active (high) and the data input $\overline{G2}$ determines the data outputs G1 and $\overline{G1}$ when the control input signal 656 is active (high). Similarly, with the second latch 662, the data input G1 determines the data outputs G2 and $\overline{G2}$ when the control input signal 650 is active (high) and the data input $\overline{G1}$ determines the data outputs G2 and $\overline{G2}$ when the control input signal 654 is active (high). When both control inputs 652 and 656 of the first latch 660 are low, the outputs G1 and $\overline{G1}$ are static and hold their present value. Similarly, when both control inputs 650 and 654 of the second latch 662 are low, the outputs G2 and $\overline{G2}$ are static and hold their present value.

OPERATION

A. Initial State

Operation of the arbiter circuit 600 is best described starting from the initial state. Request signal R1 and request signal R2 are both at logic low levels (i.e., R1=0 and R2=0), and grant signal G1, grant signal G2 and done signal D are all at logic low levels (i.e., G1=0, G2=0 and D=0) in the initial state. Signals $\overline{G1}$ and $\overline{G2}$ are at logic high levels (i.e., $\overline{G1}$=1 and $\overline{G2}$=1).

In the initial state, the output signals 620 and 622 of XOR gates 610 and 612 are both high because signals $\overline{G1}$ and $\overline{G2}$ are both high and R1 and R2 are both low. The MUTEX element $30_5$, with both its inputs high, is forced to drive one but not both of its outputs, either 630 or 632, high and the other low. Regardless of which signal 630 or 632 is high, the output signals 650 and 652 of AND gates 640 and 642 respectively are both low because done signal D is low. As a result, the control input signals 650 and 652 to latches 662 and 660 are low, and the outputs G1 and G2 remain low.

Also in the initial state, the output signals 624 and 626 of XOR gates 614 and 616 are both low. The two outputs 634 and 636 of MUTEX element $30_6$, and the outputs 654 and 656 of AND gates 644 and 646 respectively are all low. As a result, the control inputs 654 and 656 to the latches 662 and 660 are low, and outputs G1 and G2 remain low.

B. Arbitration State

If R1 transitions high, the output 626 of XOR gate 616, the output 636 of MUTEX $30_6$, and the output of 656 of AND gate 646 successively transition high. As a result, the control input 656 applied to the first latch 660 is activated, and the latch drives its output G1 to the complement of the value of G2, making G1 high, and granting the first user 14 exclusive access to the shared resource 18. Since the state of G1 and $\overline{G1}$ are changed, the data inputs to the second latch 662 are changed. If subsequently R2 transitions high, then the output signal 620 of XOR gate 610, and output 630 of MUTEX $30_5$ successively transition high. The output 650 of AND gate 640 then also transitions high with the transition of the done signal D from low to high. If the done signal D was previously received, the output 650 transitions immediately with the transition of signal 630. The second latch 662 is then activated by the transition of control input signal 650 to a high level and the data output G2 is driven high in response to the high signal (G1=1) at its data input. Subsequent requests of R1 and R2 are alternatively handled by the first arbiter element and the second arbiter element in a similar manner. If two requests R1 and R2 occur at approximately the same time, the designated MUTEX, either $30_5$ or $30_6$, selects one user in the same manner previously described.

It is useful to point out the role of the done signal D and its complement $\bar{D}$. Assume the MUTEX element $30_5$ is active and either signal 650 or signal 652 is high and the done signal D is high. When the shared resource is finished serving the current user, the done signal D transitions low. As a result, the outputs of AND gates 640 and 642 transition low and the MUTEX $30_5$ is "disconnected" from the flip flops 660 and 662. When D transitions low, signal $\overline{D}$ transitions high. In response, the outputs of AND gates 644 and 646 are controlled by their inputs 634 and 636 respectively, and the MUTEX element $30_6$ is "connected" to the flip flops 660 and 662 enabling the next grant signal to be issued. Similarly, when the done signal D transitions high and the signal $\overline{D}$ transitions low, MUTEX element $30_5$ is reconnected and MUTEX element $30_6$ is again disconnected. The done signal D and its complement $\overline{D}$ thus alternatively connect and disconnect the MUTEX elements $30_5$ or $30_6$.

The arbiter 600 provides a number of unique features not found in the prior art. Each of the two MUTEX elements $30_5$ and $30_6$ defines an "arbiter element". At any point in time, only one of the two arbiter elements is used to arbitrate and issue a grant signal for the then current request signal or request signals received by the arbiter 600. The other arbiter element concurrently recovers from the previous grant and is used to arbitrate the next request signal or signals. The next request is any request that has not yet been granted prior to the current grant. The arbitration process for the next request signal or signals starts as soon as the grant signal from the previous arbitration is generated. When the next request signal or signals is received at the arbiter 600, the designated MUTEX processes and arbitrates the signals immediately. As a result, there is only a minor delay of a few logic gates between the current request signal and grant signal after the done signal is received.

Figure 5:
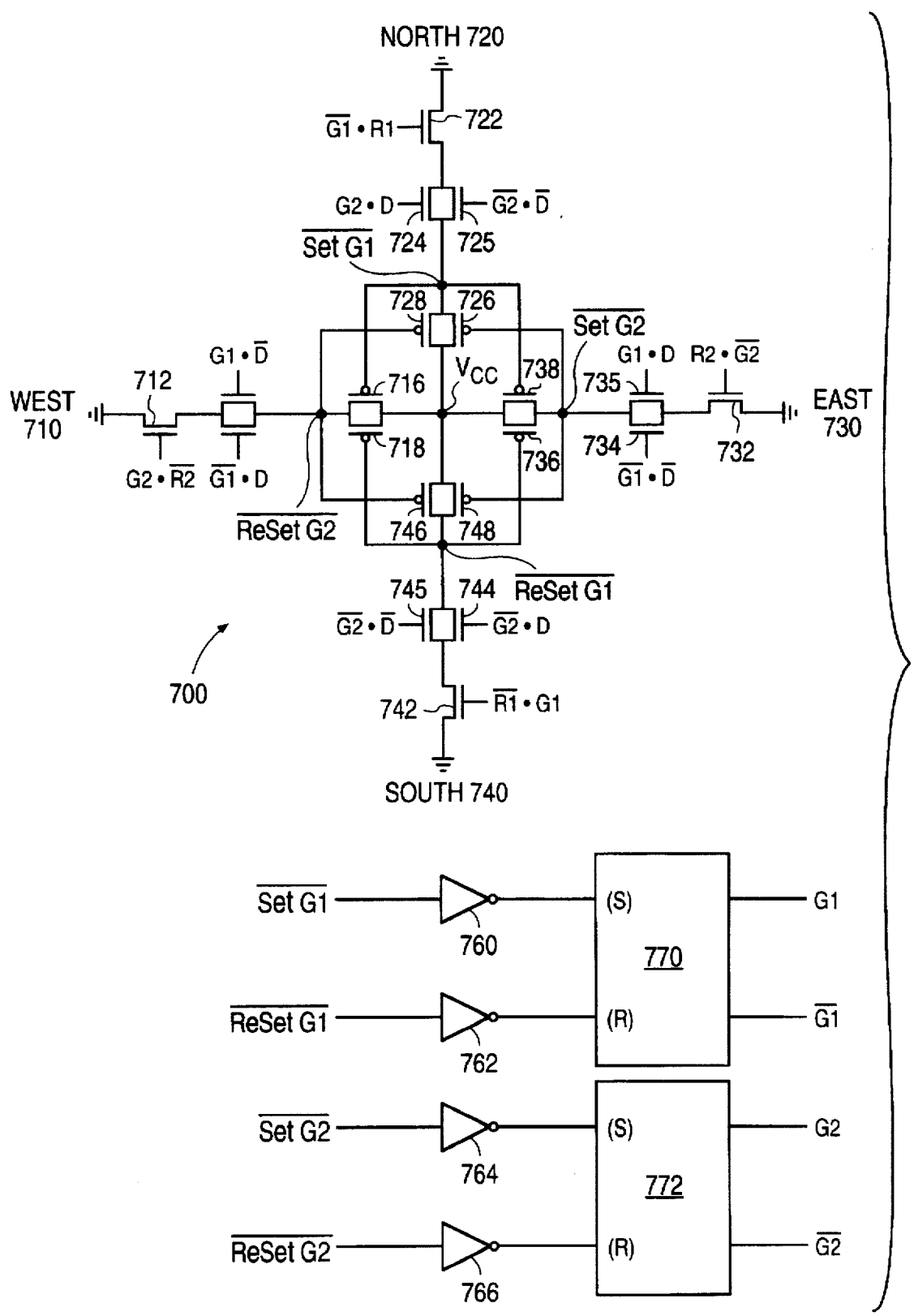
FIG. 5 illustrates a third arbiter circuit according to a third embodiment of the present invention.

Referring to FIG. 5, an arbiter circuit according to a third embodiment of the present invention is shown. The arbiter circuit 700, is hereafter called the propeller arbiter 700 because of its unique configuration. Propeller arbiter 700 includes four propeller elements 710, 720, 730 and 740 pointing in the west, north, east and south directions respectively.

The west element 710 controls node $\overline{Reset\ G2}$, the north element controls node $\overline{Set\ G1}$, the east element controls node $\overline{Set\ G2}$, and the south element controls node $\overline{Reset\ G1}$. The nodes $\overline{Set\ G1}$ and $\overline{Reset\ G1}$ are provided to the inputs of inverters 760 and 762 which, in turn, are used to drive the (S) input and the (R) input of flip flop 770 respectively. Flip flop 770 generates grant signal G1 and $\overline{G1}$ in response to high levels on its (S) input and (R) input respectively. The nodes $\overline{Set\ G2}$ and $\overline{Reset\ G2}$ are provided to the inputs of inverters 764 and 766 which, in turn, are used to drive the (S) input and (R) input of flip flop 772 respectively. Flip flop 772 generates grant signal G2 and $\overline{G2}$ in response to high levels on its (S) and (R) inputs respectively.

The west element 710 includes NMOS transistor 712, NMOS transistor 714, NMOS transistor 715, PMOS transistor 716, and PMOS transistor 718. The sources and drains of transistors 712, the parallel pair 714 and 715, and the parallel pair 716 and 718, are coupled in series between Vcc and ground. The logic input or function applied to the gates of these transistors is provided in the TABLE X below.

TABLE X

| WEST | |
|---|---|
| Transistor | Gate Input |
| 712 | $\overline{R2} \bullet G2$ |
| 714 | $G1 \bullet D$ |
| 715 | $G1 \bullet \overline{D}$ |
| 716 | Set G1 |
| 718 | Reset G1 |

The north element 720 includes NMOS transistor 722, NMOS transistor 724, NMOS transistor 725, PMOS transistor 726, and PMOS transistor 728. The sources and drains of transistors 722, the parallel pair 724 and 725, and the parallel pair 726 and 728, are coupled in series between Vcc and ground. The logic input or function applied to the gates of these transistors is provided in the TABLE XI below.

TABLE XI

| NORTH | |
|---|---|
| Transistor | Gate Input |
| 722 | $R1 \bullet \overline{G1}$ |
| 724 | $G2 \bullet D$ |
| 725 | $\overline{G2} \bullet \overline{D}$ |
| 726 | Set G2 |
| 728 | Reset G2 |

The east element 730 includes NMOS transistor 732, NMOS transistor 734, NMOS transistor 735, PMOS transistor 736, and PMOS transistor 738. The sources and drains of transistors 732 the parallel pair 734 and 735, and the parallel pair 736 and 738, are coupled in series between Vcc and ground. The logic input or function applied to the gates of these transistors is provided in the table below.

TABLE XII

| EAST | |
|---|---|
| Transistor | Gate Input |
| 732 | $R2 \bullet \overline{G2}$ |
| 734 | $\overline{G1} \bullet D$ |
| 735 | $G1 \bullet D$ |
| 736 | Reset G1 |
| 738 | Set G1 |

The south element 740 includes NMOS transistor 742, NMOS transistor 744, NMOS transistor 745, PMOS transistor 746, and PMOS transistor 748. The sources and drains of transistors 742, the parallel pair 744 and 745, and the parallel pair 746 and 748, are coupled in series between Vcc and gound. The logic input or function applied to the gates of these transistors is provided in the table below.

TABLE XIII

| SOUTH | |
|---|---|
| Transistor | Gate Input |
| 742 | $\overline{R1} \bullet G1$ |
| 744 | $\overline{G2} \bullet D$ |
| 745 | $G2 \bullet \overline{D}$ |
| 746 | Reset G2 |
| 748 | Set G2 |

13

In the propeller arbiter circuit 700 there are four arbiter elements. The first arbiter element is defined by transistor pair 736 and 748. The second arbiter element is defined by transistor pair 746 and 718. The third arbiter element is defined by transistor pair 716 and 728. The fourth arbiter element is defined by transistor pair 726 and 738.

OPERATION

A. Initial State

Operation of the propeller arbiter 700 is best described starting at the initial state. In the initial state (R1, R2, G1, G2, and the done signal D are all low (R1=0, R2=0, G1=0, G2=0 and D=0). It is also useful to note that nodes $\overline{\text{Set G1}}$, $\overline{\text{Reset G1}}$, $\overline{\text{Set G2}}$, and $\overline{\text{Reset G2}}$ are all pulled high by weak pull-up circuits (not shown). The transistors in the elements 710–740 are therefore in the following condition:

a. West (710)—Transistor 712 through 718 are off;

b. North (720)—Transistor 725 is on and transistors 722, 724, 726 and 728 are off;

c. East (730)—Transistor 734 is on and transistors 732, 735 through 738 are off; and d. South (740)—Transistor 742 through 748 are all off.

As a result, the nodes $\overline{\text{Set G1}}$, $\overline{\text{Reset G1}}$, $\overline{\text{Set G2}}$, and $\overline{\text{Reset G2}}$ all remain high. Consequently, the outputs of inverters 760 through 766 are all low and the output of flip flops 770 and 720 remain at their previous values.

B. Arbitration State

Operation of the Arbitration state is best described using several examples. If R2 transitions high, transistor 732 of the east element 730 turns on. As a result, node $\overline{\text{Set G2}}$ is pulled down towards ground through transistor 732. In response, the (S) input of flip flop 772 transitions high, and the G2 output transitions high, providing the second user 16 exclusive access to the shared resource 18.

After the grant G2 is issued, the propeller arbiter 700 recovers in anticipation of the next request signal or signals. This is automatically accomplished because the logic inputs to the various transistors of each element 710 through 740 change with the transition of R2 and G2, and D after the shared resource 18 finishes serving the second user 16. The recovery of each element is described below:

West (710)—Transistor 712 is off because $\overline{\text{R2}}$ is low. Transistor 714 turns on when D transitions high. Transistor 715 remains off because G1 is low. Transistors 716 and 718 remain off because nodes $\overline{\text{Set G1}}$ and $\overline{\text{Reset G1}}$ remain high.

North (720)—Transistor 725 turns off because $\overline{\text{G2}}$ is low. Transistor 724 turns on when D transitions high and transistor 726 turns off because node $\overline{\text{Set G2}}$ transitions high after G2 has been generated. Transistor 728 remains off because node $\overline{\text{Reset G2}}$ remains high.

East (730)—Transistor 732 turns off because $\overline{\text{G2}}$ is low. Transistor 734 turns off when D transitions high. Transistor 735 remains off. Transistors 736 and 738 remain off because nodes $\overline{\text{Set G1}}$ and $\overline{\text{Reset G1}}$ are high.

South (740)—Transistor 742 is off because G1 is low. Transistors 744 is off because $\overline{\text{G2}}$ is low. Transistor 745, which is turned on when G2 transitions high, turns off again after the $\overline{\text{D}}$ signal transitions low. Transistor 746 is off because node $\overline{\text{Reset G2}}$ is high. Transistor 748 turns off because $\overline{\text{Set G2}}$ transitions high.

It is useful to note that in the East element 730, transistor 732 turns off when $\overline{\text{G2}}$ transitions low, allowing node $\overline{\text{Set G2}}$ to be pulled back up. The propeller arbiter 700 is thereafter ready to handle the next request.

14

If R2 transitions low, indicating a new request from the second user 16, then transistor 712 and 714 of the West element 710 pull down node $\overline{\text{Reset G2}}$ low. Consequently, the $\overline{\text{G2}}$ output of the flip flop 772 transitions high and output G2 transitions low, providing the second user 16 access to the shared resource 18. Again, the change in the logic signals to the various gates of the elements 710 through 740 arbiter 700 cause the circuit to automatically recover.

Alternatively, if R1 transitioned high, indicating a request form the first user 14, then transistors 722 and 724 of the North element pull node $\overline{\text{Set G1}}$ low. The G1 output of flip flop 770 consequently transitions high providing the first user 14 exclusive access to the shared resource 18. The arbiter 700 again automatically recovers in a manner similar to that described above.

On occasion, a request R1 from the first user 14 and a request R2 from the second user 16 may occur at the same time. For example, R1 and R2 both transition high. Under these conditions, the North element 720 would attempt to pull down node $\overline{\text{Set G1}}$, and simultaneously, the East element 730 would attempt to pull down node $\overline{\text{Set G2}}$. Transistor 726 of the North element 720 and transistor 738 of the East element 730 both turn on as a consequence, providing a counter pull-up effect on the two nodes. Even if the system enters a metastable condition, eventually one node is pulled high and the other is pulled low. The node that "wins" and is pulled low causes the corresponding grant signal to be generated in the manner described above. The request signal that corresponds to the non-selected node remains ungranted.

In summary, the first arbiter element including transistors 736 and 748 and the third arbiter element including transistors 716 and 728 are complements of one another. The first arbiter element is invoked to carry out the next arbitration when the grant signal G1 is true and grant signal G2 is false. The third arbiter element is invoked when grant signal G1 is false and grant signal G2 is true. Similarly, the second arbiter element including transistors 746 and 718 and the fourth arbiter element including transistors 726 and 738 are also complements of one another. The second arbiter element is invoked to carry out the next arbitration when the grant signal G1 and the grant signal G2 are both true. The fourth arbiter element is invoked when grant signal G1 and grant signal G2 are both false. Since either grant signal G1 or grant signal G2 changes each time a request is granted, a different arbiter element is always used to make successive grants.

It is useful to note that in the propeller arbiter circuit 700, unlike in the previous two embodiments, the done signal D plays a role in selecting the next arbiter element designated to generate the next grant. In applications in which operation in usually paced by the incoming request signals, rather than by the done signal, it may be advantageous to use the propeller arbiter 700.

The arbiter circuits of the present invention may be used in any situation where arbitration among multiple users requesting access to a signal shared resource is needed. In one application currently contemplated by the Applicants, the arbiter circuit may be used in the counterflow pipeline processor described in the above identified co-pending parent applications. In other applications, the arbiter circuit 100 may be used to arbitrate access to a bus, a memory location, or any other shared resource in an information handling system such as a computer or a communication network.

While the present invention has been described in relationship to the embodiments described in the accompanying specification, other alternatives, embodiments and modifications will be apparent to one skilled in the art. It is intended that the specification be only exemplary, and that the true scope and spirit of the invention be indicated by the following claims.

What is claimed is:

1. An arbiter configured to receive request signals from a plurality of users and to perform a first arbitration and a next arbitration, including:
   a plurality of arbiter elements coupled to receive the request signals;
   a grant circuit configured to issue a first grant and a next grant in response to output signals from a first arbiter element and a next arbiter element of the plurality of arbiter elements respectively; and
   a feedback element configured to feed back the first grant signal from the grant circuit to the plurality of arbiter elements to invoke the next arbiter element, such that the first arbitration and the next arbitration are performed by different arbiter elements, and the next arbitration may begin as soon as the first grant is issued as a result of the first arbitration.

2. The arbiter of claim 1, wherein the issuance of the first grant is indicated by a transition of a first grant signal from FALSE to TRUE or by a transition of the first grant signal from TRUE to FALSE.

3. The arbiter of claim 1, further including a coupling circuit, coupled between the plurality of arbiter elements and the grant circuit, the coupling circuit configured to couple selected ones of the plurality of output signals from the plurality of arbiter elements to the grant circuit.

4. The arbiter of claim 3, further including a selection circuit, coupled to receive the grant signals and the request signals from the plurality of users, and configured to select the next arbitration element to perform the next arbitration based on the state of the grant signals and the request signals.

5. The arbiter of claim 4, wherein the selection circuit is coupled to further receive a done signal and is configured to select the next arbiter element based on the state of the grant signals and the done signal.

6. The arbiter of claim 5, wherein the done signal is generated internally within the arbiter at a time following each grant issuance after a predetermined delay.

7. The arbiter of claim 4, wherein the selection circuit further includes a plurality of AND gates, each one of the plurality of AND gates being configured to receive a different combination of the grant signals and the request signals.

8. The arbiter of claim 4, wherein the selection circuit further includes a plurality of XOR gates, each one of the plurality of XOR gates being configured to receive a different combination of true and complement of the grant signals and request signals.

9. The arbiter of claim 4 wherein the selection circuit is configured to reset the first arbiter element to perform a subsequent arbitration after the next arbitration.

10. The arbiter of claim 3, wherein the coupling circuit is configured to receive a done signal corresponding to the first grant issuance.

11. The arbiter of claim 10, wherein the coupling circuit is configured to activate the grant circuit and to enable the arbiter to issue the next grant after the done signal and a next one of the output signals from the next arbiter element are received.

12. The arbiter of claim 10, wherein the first done signal is generated internally within the arbiter at a time following the first grant issuance after a predetermined delay.

13. The arbiter of claim 3, wherein the coupling circuit further includes a plurality of AND gates, each of the plurality of AND gates configured to receive a different one of the output signals from the plurality of arbiter elements and a done signal.

14. The arbiter of claim 13, wherein the coupling circuit further includes a plurality of OR gates coupled between the plurality of AND gates and the grant circuit, the OR gates and the AND gates cooperatively configured to cause the grant circuit to issue the next grant upon receipt of the done signal following issuance of the first grant and the receipt of a next output signal from the next arbiter element.

15. The arbiter of claim 1, wherein each of the plurality of arbiter elements is a mutual exclusion element.

16. The arbiter of claim 1, wherein the grant circuit includes a plurality of latches configured to issue the plurality of grants.

17. The arbiter of claim 16, wherein a first latch among the plurality of latches is configured to provide a first grant signal and a complement of the first grant signal.

18. The arbiter of claim 17, wherein the issuance of the first grant is determined by a transition of a first grant signal and a complement of the first grant signal.

19. The arbiter of claim 1, further including a de-coupling circuit, coupled to the plurality of arbiter elements and the grant circuit, and configured to de-couple the first arbiter element from the grant circuit when a done signal is received that corresponds to the issuance of the first grant.

20. The arbiter of claim 1, further including a shared resource coupled to the arbiter, wherein the arbiter provides access to the shared resource to only one of the plurality of users at a time.

21. A method of providing an arbiter configured to receive request signals from a plurality of users and to perform a first arbitration and a next arbitration, including the steps of:
    providing a plurality of arbiter elements coupled to receive the request signals;
    providing a grant circuit configured to issue a first grant and a next grant in response to output signals from a first arbiter element and a next arbiter element among the plurality of arbiter elements respectively; and
    providing a feedback element configured to feed back the first grant signal from the grant circuit to the plurality of arbiter elements to invoke the next arbiter element, such that the first arbitration and the next arbitration are performed by different arbiter elements, and the next arbitration may begin as soon as the first grant is issued as a result of the first arbitration.

22. The method of claim 21, further including the step of coupling the plurality of arbiter elements and the grant circuit, such that selected ones of the plurality of output signals from the plurality of arbiter elements are coupled to the grant circuit.

23. The method of claim 22, further the step of providing a selection circuit, coupled to receive the grant signals and the request signals from the plurality of users, and configured to select the next arbitration element to perform the next arbitration based on the state of the grant signals and the request signals.

24. The method of claim 22, wherein a coupling circuit is configured to activate the grant circuit and to enable the arbiter to issue the next grant after the done signal and a next one of the output signals from the next arbiter element are received.

25. The method of claim 21, further including a shared resource coupled to the arbiter, wherein the arbiter provides access to the shared resource to only one of the plurality of users at a time.

* * * * *